United States Patent [19]

Maslanka

[11] Patent Number: 4,708,772

[45] Date of Patent: * Nov. 24, 1987

[54] PAPER PRODUCTS CONTAINING WET STRENGTH RESINS

[75] Inventor: William W. Maslanka, Landenberg, Pa.

[73] Assignee: Hercules Incorporated, Wilmington, Del.

[*] Notice: The portion of the term of this patent subsequent to May 7, 2002 has been disclaimed.

[21] Appl. No.: 863,658

[22] Filed: May 15, 1986

Related U.S. Application Data

[60] Division of Ser. No. 689,739, Jan. 8, 1985, Pat. No. 4,605,709, which is a continuation of Ser. No. 517,159, Jul. 25, 1983, abandoned, and a continuation-in-part of Ser. No. 488,894, Apr. 27, 1983, abandoned.

[51] Int. Cl.$^4$ ............................................... D21H 3/58
[52] U.S. Cl. ............................... 162/164.3; 162/164.6; 162/164.7; 162/168.2
[58] Field of Search ............... 162/164.3, 168.2, 164.6, 162/164.7

[56] References Cited

U.S. PATENT DOCUMENTS

| | | | |
|---|---|---|---|
| 2,926,154 | 2/1960 | Keim | 260/29.2 |
| 3,311,594 | 3/1967 | Earle, Jr. | 260/77.5 |
| 3,793,279 | 2/1974 | Liposwski | 260/29.2 |
| 3,887,510 | 6/1975 | Chan et al. | 260/29.2 N |
| 3,891,589 | 6/1975 | Ray-Chaudhuri | 260/29.2 EP |
| 4,388,439 | 6/1983 | Maslanka | 524/845 |
| 4,515,657 | 5/1985 | Maslanka | 162/164.3 |

FOREIGN PATENT DOCUMENTS 865727  4/1961  United Kingdom .

*Primary Examiner*—Peter Chin
*Attorney, Agent, or Firm*—Ivan G. Szanto; William E. Player

[57] ABSTRACT

Disclosed are novel wet strength resins for paper, said resins being derived by reacting an epihalohydrin, such as epichlorohydrin, with a polyamino-copolyamide derived by reacting methylbisaminopropylamine with (a) a diester of oxalic acid and (b) a diester of a saturated dicarboxylic acid containing at least 4 carbon atoms, the mole ratio of (a) to (b) being from about 0.25:1 to about 10:1.

7 Claims, No Drawings

PAPER PRODUCTS CONTAINING WET STRENGTH RESINS

This application is a division of application Ser. No. 689,739, filed Jan. 8, 1985, now U.S. Pat. No. 4,605,709, which is a continuation of application Ser. No. 517,159, filed July 25, 1983, now abandoned, and is a continuation-in-part of application Ser. No. 488,894 filed Apr. 27, 1983 abandoned.

This invention relates to a new wet and dry strength resin for paper. Particularly, this invention relates to a wet and dry strength resin for use in the manufacture of paper, the broke of which can be easily and readily repulped.

Broke is a waste product of the paper industry which, if not recovered and utilized, represents a substantial loss. It is customary to repulp the broke and reuse it in the papermaking process. Wet strength broke is difficult to repulp and the repulping of wet strength broke is discussed by Schmalz in TAPPI, Vol. 44, pages 275–280 (April 1961).

It has been found that repulping of wet strength broke is facilitated when the resin of this invention is employed in the manufacture of wet strength paper.

Cationic, water-soluble, thermosetting resins derived by the reaction of aminopolyamides with epichlorohydrin are known wet strength resins for paper. Typical of these wet strength resins are the resins of U.S. Pat. No. 2,926,154 to Keim derived by the reaction of epichlorohydrin and an aminopolyamide produced from a polyalkylene polyamine and a $C_3$ to $C_8$ saturated aliphatic dicarboxylic acid such as glutaric acid, adipic acid and the like. British Pat. No. 865,727 to Hercules Powder Co. and U.S. Pat. No. 3,311,594 to Earle, Jr. also disclose resins derived by reaction of epichlorohydrin and an aminopolyamide derived from a $C_3$ to $C_{10}$ saturated dicarboxylic acid and N-bis(aminopropyl)-methylamine, also known as methylbisaminopropylamine. See also U.S. Pat. No. 3,793,279 to Kipowski, U.S. Pat. No. 3,887,510 to Chan et al and U.S. Pat. No. 3,891,589 to Ray-Chaudhuri which disclose the use of diesters derived from $C_2$ to $C_{20}$ saturated dicarboxylic acids in the preparation of aminopolyamides which are subsequently reacted with epichlorohydrin. Other U.S. patents which describe cationic, thermosetting, wet strength resins for paper are U.S. Pat. Nos. 3,224,990; 3,240,664; 3,332,901 and 3,700,623.

In accordance with this invention there is provided a new wet strength resin. The new resin is derived by reacting an epihalohydrin, such as epichlorohydrin, with a polyaminocopolyamide derived by the reaction of (a) a diester of oxalic acid and (b) a diester of a saturated aliphatic dicarboxylic acid containing at least 4 carbon atoms with methylbisaminopropylamine. The preferred diesters derived from oxalic acid are dimethyl oxalate, diethyl oxalate, and dipropyl oxalate. The preferred diesters of dicarboxylic acids contain 4 to 8 carbon atoms and more preferably are the diesters of adipic and glutaric acid derived from $C_1$–$C_3$ saturated aliphatic monohydric alcohols such as methanol, ethanol, propanol, and isopropanol. Specific examples of the preferred diesters are dimethyl adipate, diethyl adipate, dipropyl adipate, dimethyl glutarate, diethyl glutarate and dipropyl glutarate.

In the preparation of the resins of this invention the diester components are first reacted with methylbisaminopropylamine to produce a long chain polyamino-copolyamide. Methylbisaminopropylamine, also referred to in the art as N-bis(aminopropyl)methylamine, has the formula

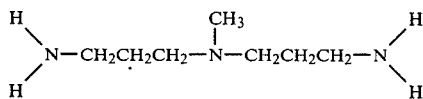

The polyamino-copolyamide is then reacted in aqueous solution with an epihalohydrin to form a water-soluble cationic thermosetting resin.

Reaction of the diester components with methylbisaminopropylamine is preferably carried out neat but can also be carried out in a solution of the reactants in a suitable solvent such as an alcohol-water mixture containing, for example, equal parts of ethanol and water. The diester of oxalic acid and the diester of the other dicarboxylic acid can be added separately or simultaneously to the amine. Usually, the mole ratio of the diester of oxalic acid to the diester of the other dicarboxylic acid will range from about 0.25:1 to about 10:1, the preferred range being from about 1:4 to about 4:1 and more preferably from about 1:3 to about 3:1. Temperatures employed in the reaction can vary between about 110° C. and about 225° C. and the preferred temperature range is about 140° C. to about 200° C. Time of reaction depends on temperature and is inversely proportional thereto. Reaction time will vary from about ½ to two hours.

In carrying out the reaction, it is preferred to use a total amount of the diesters sufficient to react substantially completely with the primary amine groups of the methylbisaminopropylamine. This will ususally require a mole ratio of amine to diesters of from about 0.9:1 to about 1.2:1. The preferred mole ratio is about 1:1.

In converting the polyamino-copolyamide to a water-soluble cationic thermosetting resin, the polyamino-copolyamide is reacted in aqueous solution with an epihalohydrin, preferably epichlorohydrin at a temperature from about 40° C. to about 100° C. and preferably from about 45° C. to 85° C. until the viscosity of a 25% solids solution at 25° C. has reached about E-F or higher on the Gardner-Holdt scale. In those cases where the free amine form of the polyamino-copolyamide has limited water solubility, the reaction is carried out using the polyamino-copolyamide in the form of its water soluble acid salt. The acid salt of the polyamino-copolyamide is easily and readily prepared by adding to an aqueous dispersion of the polyamino-copolyamide a water-soluble acid such as hydrochloric acid in an amount essentially stoichiometrically equivalent to the tertiary amines of the polyamino-copolyamide whereby essentially all the tertiary amines are converted to the acid salt. Suitable acids for salt formation are water-soluble, are within the skill of the art and include inorganic acids such as sulfuric acid, hydrochloric acid, nitric acid and phosphoric acid and organic acids such as acetic acid.

In the polyamino-copolyamide-epihalohydrin reaction, it is preferred to use sufficient epihalohydrin to convert all tertiary amine groups to quaternary ammonium groups.

Satisfactory resins can be prepared by using from about 1 mole to about 1.5 moles and preferably from about 1.2 to about 1.4 moles of epihalohydrin per mole of tertiary amine of the polyamino-copolyamide. pH adjustment is usually not necessary during reaction. However, since the pH decreases during the reaction it may be desirable in some cases to add alkali to combine with at least some of the acid formed. When the desired viscosity is reached, sufficient additional water is added to adjust the solids content of the resin solution to about 15% or less and the product cooled to room temperature, about 25° C. The resin will contain a plurality of reactive

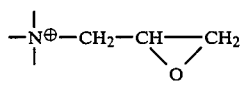

groups

The resin is preferably stabilized against premature gelation by converting essentially all the reactive

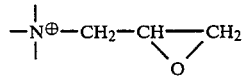

groups to inactive

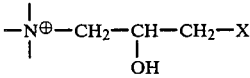

groups, x being the halogen of the epihalohydrin and chlorine when the epihalohydrin is epichlorohydrin.

The stabilization is accomplished by adding a water-soluble acid to the resin solution until essentially all the reactive groups are changed to the inactive form. This is accomplished by adding sufficient water-soluble acid to obtain and maintain a pH of from about 1 to 3. The reactive groups are thereby changed to the inactive form and the resin solution will be stabilized against gelation. When the pH remains at the desired pH for a period of about one hour at room temperature (about 25° C.) it is relatively certain that the pH will not change and the resin solution is stabilized against gelation. By this means, stable solutions having a resins solids content of from about 10% to about 50% can be prepared.

Acids that can be employed in the above stabilization procedure are water-soluble acids such as hydrochloric acid, hydrobromic acid, hydrofluoric acid, hydroiodic acid, sulfuric acid, nitric acid, phosphoric acid and acetic acid. Mixtures of two or more water soluble acids can be used if desired.

Prior to use in the paper mill the stabilized resin is "reactivated" by adjusting the pH of the resin solution to and maintaining it above about 8, preferably 10.5 and higher. Preferred pH range is 10.5 to 11. This reconverts essentially all the inactive

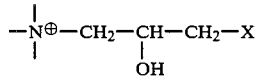

groups to the reactive cross-linking

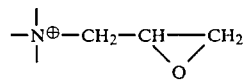

groups. This pH adjustment is made by the addition of a suitable organic or inorganic base such as the alkali metal hydroxides and carbonates, calcium hydroxide, benzyltrimethylammonium hydroxide, and tetramethylammonium hydroxide. The alkali metals include sodium, potassium, cesium and lithium. The base is added preferably as an aqueous solution.

The polyamide-epichlorohydrin resins, prepared as herein described, may be incorporated into pulp slurry at any point on the wet end of the paper machine. However, prior to use, the stabilized resin must be reactivated as above set forth to convert the halohydrin groups to epoxide groups.

The resins of this invention exhibit high "off-the-machine" wet strength and moderate to high dry strength. For most purposes, adequate wet strength can be obtained by incorporating in the paper from about 0.2% to about 3% of the resin based on the dry weight of the pulp.

The invention is further illustrated by the following examples which demonstrate the best known embodiments of the invention. In these examples, intrinsic viscosity (I.V.) measurements were determined at 25° C. on a 2% solution in 1M ammonium chloride and Brookfield viscosity measurements were determined at 25° C. using a #1 spindle at 60 r.p.m. unless otherwise indicated.

EXAMPLE 1

Part A—Methylbisaminopropylamine, 145.3 grams (1 mole) was charged to a resin kettle equipped with anchor stirrer, thermometer, heating mantle, nitrogen sparge and Dean-Stark water trap with condenser and the charge was heated to 150° C. Dimethyl adipate, 43.55 grams (0.25 mole) and diethyl oxalate, 109.6 grams (0.75 mole) were combined and added dropwise keeping the temperature of the reaction mass between about 147° C. and about 150° C. After the addition was complete (about 1 hour) the temperature of the reaction mass was allowed to rise to about 190°–195° C., the alcohol was collected and the reaction mixture was maintained at 195° C. for a period of about 20 minutes. A very viscous polyamino-copolyamide resulted which was poured into an aluminum pan. The yield of polyamino-copolyamide was 194 grams and it had an I.V. of 0.141.

Part B—25.6 grams of the polyamino-copolyamide of Part A, 62.5 ml of water, and 11.75 grams of 37.5% aqueous HCl were thoroughly admixed to provide a 28.9% aqueous solution of the resulting salt, the pH of the solution being 4.65. 86.44 grams of the 28.9% aqueous solution (25 grams, 0.1 mole of resin solids) were placed into a reaction vessel together with 44.5 ml of water and the pH of the solution was adjusted to 8.0 with 3.9 ml of 5 molar NaOH. Epichlorohydrin 11.6 grams (0.125 mole) was added and the temperature of the resulting solution which was at room temperature (about 25° C., was raised to 52°–72° C. and the viscosity of the solution monitored. When the Gardner-Holdt viscosity reached E, 220 ml of water was added and the pH was adjusted to 2 with 10 molar HCl. Periodic pH adjustments were made until the pH of 2 was constant for about 60 minutes. The resulting solution had a solids content of 9.73% by weight and a Brookfield viscosity of 15 cps.

EXAMPLE 2

A 50:50 by weight mixture of Rayonier bleached kraft pulp and Weyerhaeuser bleached hardwood kraft pulp was beaten to Canadian Standard freeness of 500 cc in a Noble and Wood cycle beater. The pulp was then adjusted to pH 7.5 with 10% NaOH and varying amounts, as specified in Table 1, based on the dry weight of pulp, of the polyamino-copolyamide-epichlorohydrin resin prepared in Example 1, were added. The solution of Example 1 was reactivated for use by diluting 25 grams of the solution to about 3% solids with water, and adding, with mixing, 8.6 ml of 1N sodium hydroxide and 27.8 ml of water. The resulting solution had a resin solids content of about 2% and a pH of about 11.7. The pulp was sheeted on a Noble and Wood handsheet machine to provide handsheets having a basis weight of approximately 40 pounds per ream (3000 square feet) and the resulting handsheets were wet pressed to a 33% solids content and then dried at 105° C. for 45 seconds on a steam heated drum drier to 3-4% moisture. The dry strength was tested "uncured" (after 7 days of natural aging) or "cured" (after 30 minutes at 80° C.). The sheets tested for wet strength were soaked for two hours in distilled water. Results are listed in Table 1.

TABLE 1

| % of Resin Added | Basis Weight | Tensile Strength (lbs/inch) | | | |
|---|---|---|---|---|---|
| | | Dry | | Wet | |
| | | Uncured | Cured | Uncured | Cured |
| 0.25 | 40.6 | 21.3 | 21.8 | 3.15 | 3.26 |
| 0.50 | 40.1 | 22.4 | 22.0 | 3.89 | 4.07 |
| 0.75 | 40.4 | 23.3 | 23.9 | 4.72 | 5.01 |
| — | 39.9 | 18.9 | 19.0 | 0.58 | 0.62 |

EXAMPLE 3

Handsheets were prepared in accordance with the procedure of Example 2, using 0.7% resin based on the dry weight of the pulp. The handsheets gave a dry tensile of 19.8 (uncured) and 19.7 (cured) and a wet tensile of 3.69 (uncured) and 4.02 (cured) pounds per inch at a basis weight of 39.8 pounds per ream. Samples of these handsheets were repulped in aqueous NaOH at a pH of about 12 and at a temperature of about 85° C. Repulping of the paper sheets was carried out according to TAPPI method 205 m-58 at a mixer speed of 2800 r.p.m., a pulp consistency of 1.3% and a pH of 12. The degree of repulping (fiber separation) was measured and reported in integers ranging from 1-6, the integer 6 indicating substantially complete repulping. After 20 minutes, the degree of repulping was measured at 5 and after 30 minutes there was substantially complete repulping.

EXAMPLE 4

Part A—The procedure of Example, 1 Part A was repeated except that 87.1 grams (0.5 mole) of dimethyl adipate and 73.1 grams (0.5 mole) of diethoxyalate were used. The yield of polyamino-copolyamide was 205 grams and it had an I.V. of 0.146.

Part B—27.25 grams of the polyamino-copolyamide of Part A, 64 ml of water and 11.75 grams of 37.5% HCl were thoroughly mixed to provide a 29.5% aqueous solution of the resulting salt, the pH of the solution being 4.45. 84.7 grams of the 29.5% aqueous solution (25 grams, 0.095 mole of resin solids) were placed in a reaction vessel with 43 ml of water and the pH was adjusted to 8.1 with 4.45 ml of 5 molar NaOH. Epichlorohydrin, 10.9 grams (0.118 mole) was added and the temperature of the resulting solution was raised to 67°-72° C. and the viscosity of the solution was monitored. When the Gardner-Holdt viscosity reached E-F, 2.5 ml of water were added and the pH was adjusted to 2 with 10 molar HCl. Periodic pH adjustments were made until the pH was constant for about 60 minutes. The resulting solution had a solids content of 9.62% and a Brookfield viscosity of 19.4 cps.

EXAMPLE 5

Part A—The procedure of Example 1, Part A was repeated except that 130.7 grams (0.75 mole) of dimethyl adipate and 36.5 grams (0.25 mole) of diethyl oxalate were used. The polyamino-copolyamide had an I.V. of 0.137.

Part B—28.9 grams of the polyamino-copolyamide of Part A, 70.4 ml of water and 11.75 grams of 37.5% HCl were thoroughly mixed to provide a 29.13% aqueous solution of the resulting salt, the pH of the solution being 4.3. 95.7 grams of the 29.13% aqueous solution (27.9 grams, 0.10 mole of resin solids) were placed in a reaction vessel with 47 ml of water and the pH was adjusted to 8.1 with 4 ml of 5 molar NaOH. Epichlorohydrin, 11.6 grams (0.125 mole) was added and the temperature of the resulting solution was raised to 69°-72° C. and the viscosity of the solution was monitored. When the Gardner-Holdt viscosity reached E-F, 237 ml of water were added and the pH was adjusted to 2 with 10 molar HCl. Periodic pH adjustments were made until the pH was constant for about 60 minutes. The resulting solution had a solids content of 9.73% and a Brookfield viscosity of 17 cps.

EXAMPLE 6

Part A—The procedure of Example 1, Part A was repeated except that 40.1 grams (0.25 mole) of dimethyl glutarate were substituted for the 43.55 grams of dimethyl adipate. The yield of polyamino-copolyamide was 185 grams and it had an I.V. of 0.161.

Part B—25.1 grams of the polyamino-copolyamide of Part A, 61.4 ml of water and 11.75 grams of 37.5% HCl were thoroughly mixed to provide a 29.22% aqueous solution of the resulting salt, the pH of the solution being 6.5. 85.56 grams of the 29.22% aqueous solution (25.0 grams, 0.101 mole of resin solids) were placed in a reaction vessel with 46 ml of water and the pH was adjusted to 8.05 with 3.3 ml of 5 molar NaOH. Epichlorohydrin, 11.6 grams (0.125 mole) was added and the temperature of the resulting solution was raised to 65°-71° C. and the viscosity of the solution was monitored. When the Gardner-Holdt viscosity reached E-F, 220 ml of water were added and the pH was adjusted to 2 with 10 molar HCl. The resulting solution had a solids content of 9.7% and a Brookfield viscosity of 19.2 cps.

EXAMPLE 7

Part A—The procedure of Example 4, Part A was repeated except that 80.1 grams (0.5 mole) of dimethyl glutarate were substituted for the 87.1 grams of dimethyl adipate. The yield of polyamino-copolyamide was 197 grams and it had an I.V. of 0.152.

Part B—26.4 grams of the polyamino-copolyamide of Part A, 64.5 ml of water and 11.75 grams of 37.5% HCl were thoroughly mixed to provide a 29.2% aqueous solution of the resulting salt, the pH of the solution being 6.65. 85.58 grams of the 29.2% aqueous solution (25.0 grams, 0.098 mole of resin solids) were placed in a reaction vessel with 45.8 ml of water and the pH was adjusted to 8.0 with 2.1 ml of 5 molar NaOH. Epichlorohydrin, 11.3 grams (0.123 mole) was added and the temperature of the resulting solution was monitored. When the Gardner-Holdt viscosity reached E-F, 362 ml of water were added and the pH was adjusted to 2 with 10 molar HCl. The resulting solution had a solids content of 9.7% and a Brookfield viscosity of 17.5 cps.

EXAMPLE 8

Part A—The procedure of Example 5, Part A was repeated except that 120.2 grams (0.75 mole) of dimethyl glutarate were substituted for the 130.7 grams of dimethyl adipate. The polyamino-copolyamide had an I.V. of 0.141.

Part B—27.7 grams of the polyamino-copolyamide of Part A, 67.5 ml of water and 11.75 grams of 37.5% HCl were thoroughly mixed to provide a 28.57% aqueous solution of the resulting salt, the pH of the solution being 6.6. 87.5 grams of the 28.57% aqueous solution (25.0 grams, 0.098 mole of resin solids) were placed in a reaction vessel with 42 ml of water and the pH was adjusted to 8.0 with 2.3 ml of 5 molar NaOH. Epichlorohydrin, 10.8 grams (0.117 mole) was added and the temperature of the resulting solution was raised to 63°-76° C. and the viscosity of the solution was monitored. When the Gardner-Holdt viscosity reached E-F, 215 ml of water were added and the pH was adjusted to 2 with 10 molar HCl. The resulting solution had a solids content of 9.7% and a Brookfield viscosity of 18 cps.

EXAMPLES 9 TO 13

The resin solutions of Examples 4 to 8 were activated for use using the procedure set forth in Example 2, and paper sheets were prepared using the resulting solutions and tested in accordance with the procedure of Example 2. Strength properties of the sheets are set forth in Table II below.

TABLE II

| Ex. No. | Resin of | Addition % of Pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 9 | Ex. 4 | 0.25 | 40.5 | 21.8 | 21.2 | 2.70 | 2.73 |
| | | 0.50 | 40.5 | 21.9 | 22.8 | 3.91 | 3.96 |
| | | 0.75 | 40.2 | 21.3 | 22.2 | 4.37 | 4.34 |
| 10 | Ex. 5 | 0.25 | 40.5 | 21.5 | 21.7 | 2.46 | 2.57 |
| | | 0.50 | 40.2 | 20.9 | 21.3 | 3.12 | 3.15 |
| | | 0.75 | 39.9 | 21.2 | 21.4 | 3.56 | 3.80 |
| 11 | Ex. 6 | 0.25 | 39.9 | 20.7 | 21.8 | 3.04 | 3.17 |
| | | 0.50 | 40.1 | 21.5 | 22.6 | 3.61 | 4.09 |
| | | 0.75 | 40.0 | 22.4 | 22.9 | 4.47 | 4.75 |
| 12 | Ex. 7 | 0.25 | 40.3 | 21.3 | 21.1 | 3.00 | 3.16 |
| | | 0.50 | 40.2 | 22.5 | 21.0 | 3.67 | 3.95 |
| | | 0.75 | 40.3 | 22.8 | 22.9 | 4.40 | 4.69 |
| 13 | Ex. 8 | 0.25 | 40.0 | 20.8 | 20.9 | 2.67 | 2.90 |
| | | 0.50 | 40.3 | 21.2 | 20.3 | 3.44 | 3.15 |
| | | 0.75 | 41.1 | 21.4 | 21.4 | 3.96 | 4.26 |
| Blank | — | — | 39.9 | 18.9 | 19.0 | 0.58 | 0.62 |

EXAMPLES 14 TO 16

Paper sheets were prepared in accordance with the method of Example 2 using an amount (based on dry pulp) of the resins of Examples 4, 6 & 7 to provide uncured sheets of substantially equivalent wet strength. The strength properties of these sheets are set forth in Table III.

TABLE III

| Ex. No. | Resin of | Addition % of Pulp | Basis Weight | Tensile Strength (lbs/inch) | | | |
|---|---|---|---|---|---|---|---|
| | | | | Dry | | Wet | |
| | | | | Uncured | Cured | Uncured | Cured |
| 14 | Ex. 4 | 0.8 | 40.0 | 19.9 | 19.3 | 3.72 | 3.94 |
| 15 | Ex. 6 | 0.75 | 40.1 | 19.3 | 20.0 | 3.64 | 3.85 |
| 116 | Ex. 7 | 0.75 | 40.1 | 20.0 | 20.5 | 3.80 | 3.90 |
| Blank | — | — | 39.9 | 17.8 | 18.0 | 0.60 | 0.59 |

The paper sheets were repulped in aqueous NaOH at a pH of about 12 and a temperature of about 85° C. The degree of repulping was measured at 5 and 10 minutes and then every 10 minutes up to a total of 1 hour (or until stage 6, essentially complete fiber separation was reached) using the method set forth in Example 3. Test results are set forth in Table IV below.

TABLE IV

| Example No. | Degree of Repulping (After Minutes) | | | |
|---|---|---|---|---|
| | 5 | 10 | 20 | 30 |
| 14 | <1 | 3 | 5 | 6 |
| 15 | 1 | 3 | 5 | 6 |
| 16 | 1 | 3 | 5 | 6 |

EXAMPLES 17 TO 19

Polyamino-copolyamides were prepared according to the procedures of Examples 6 to 8, Part A and 0.10 mole of each of the resulting polyamino-copolyamides, as its acid salt solution, was reacted with 0.125 mole of epichlorohydrin at a solids content of 25%, a pH of 8.0 and a temperature of 65°-77° C. until the Gardner-Holdt viscosity reached E to F, after which time the resin solution was diluted with water and the pH was adjusted to 1-2 according to the general procedure of Example 1, Part B.

For the sake of comparison, a control resin was also prepared as above except that the polyamino-polyamide was formed by reacting 1 mole of methylbisaminopropylamine with 1 mole of dimethyl glutarate at 180°-190° C. for 1 hour.

The resin solutions prepared above were activated and used to prepare paper sheets in accordance with the procedure of Example 2. Details of these examples and the control are set forth in Table V and the strength properties of the paper sheets are set forth in Table VI, below.

TABLE V

| | Ex. 17 | Ex. 18 | Ex. 19 | Control |
|---|---|---|---|---|
| Reactants (moles) | | | | |
| methylbisaminopropylamine | 1.0 | 1.0 | 1.0 | 1.0 |
| diethyl oxalate | 0.75 | 0.50 | 0.25 | — |
| dimethyl glutarate | 0.25 | 0.50 | 0.75 | 1.0 |
| Intrinsic Viscosity of polyamide | 0.161 | 0.152 | 0.141 | 0.132 |
| Resin Solution | | | | |
| Total Solids (%) | 8.9 | 9.2 | 9.4 | 9.1 |
| Brookfield Viscosity (cps) | 20.7 | 16.8 | 16.4 | 17.0 |

TABLE VI

| Ex. No. | Addition % of Pulp | Basis Weight | Tensile Strength (lbs/inch) | | | |
|---|---|---|---|---|---|---|
| | | | Dry | | Wet | |
| | | | Uncured[1] | Cured | Uncured[1] | Cured |
| 17 | 0.25 | 40.5 | 19.9 | 21.6 | 2.84 | 4.01 |
| | 0.50 | 40.4 | 21.7 | 23.0 | 4.24 | 5.31 |
| | 0.75 | 40.7 | 22.7 | 24.7 | 4.79 | 5.64 |
| 18 | 0.25 | 40.2 | 20.9 | 21.7 | 3.15 | 3.95 |
| | 0.50 | 40.2 | 20.8 | 22.7 | 3.99 | 5.00 |
| | 0.75 | 40.7 | 22.2 | 24.4 | 4.57 | 5.64 |
| 19 | 0.25 | 40.9 | 19.6 | 20.3 | 2.68 | 3.14 |
| | 0.50 | 40.8 | 19.5 | 22.6 | 3.41 | 4.08 |
| | 0.75 | 40.5 | 22.0 | 21.8 | 3.83 | 5.15 |
| Control | 0.25 | 40.3 | 19.8 | 21.6 | 2.39 | 3.21 |
| | 0.50 | 40.8 | 20.1 | 21.5 | 3.07 | 3.82 |
| | 0.75 | 41.1 | 20.5 | 21.8 | 3.57 | 4.71 |
| Blank | — | 40.6 | 18.0 | 19.1 | 0.48 | 0.61 |

[1] after 5 days of natural aging

EXAMPLES 20 TO 22

Paper sheets were prepared in accordance with the method of Example 2 using an amount (based on dry pulp) of the resins of Examples 17 to 19 and the control to provide uncured sheets of substantially equivalent wet strength. The strength properties of these sheets are set forth in Table VII.

TABLE VII

| Ex. No. | Resin of | % Resin Added | Basis Weight | Wet Tensile Strength lbs/inch, uncured |
|---|---|---|---|---|
| 20 | Ex. 17 | 0.75 | 40.5 | 4.36 |
| 21 | Ex. 18 | 0.80 | 40.0 | 4.40 |
| 22 | Ex. 19 | 1.00 | 40.1 | 4.05 |
| Control | Control | 1.00 | 40.5 | 3.64 |
| Blank | — | — | 40.2 | 0.55 |

The paper sheets were repulped in aqueous NaOH at a pH of about 12 and a temperature of about 85° C. The degree of repulping was measured in the manner of Examples 14 to 16 and the results are set forth in Table VIII.

TABLE VIII

| Example No. | Degree of Repulping (After Minutes) | | | | | | |
|---|---|---|---|---|---|---|---|
| | 5 | 10 | 20 | 30 | 40 | 50 | 60 |
| 20 | <1 | 2 | 5 | 6 | | | |
| 21 | 1 | 2 | 5 | 6 | | | |
| 22 | 1 | 2 | 4 | 5 | 6 | | |
| Control | <1 | <1 | 1 | 2 | 3 | 3 | 4 |

It is to be understood that the resin solutions prepared in accordance with this invention can be used to impart wet and dry strength to paper without first being stabilized against premature gelation followed by reactivation with base. Thus, if the resin solution is to be used promptly there is no need to go through the stabilization and reactivation steps. However, as is usually the case, the resin solution will be stored for a period of time prior to use, during which time premature gelation can occur. Thus, it is recommended that pH adjustment to insure against premature gelation be made during the manufacturing process.

The above description and working examples are illustrative of this invention and not in limitation thereof.

What I claim and desire to protect by Letters Patent is:

1. A paper product having wet and dry strength and improved repulpability comprising sheeted cellulose fibers treated with from about 0.2 to about 3% by weight, based on dry weight of fibers, of a water-soluble, cationic thermosetting resin derived by reacting methylbisaminopropylamine with (a) a diester of oxalic acid and (b) a diester of a saturated aliphatic dicarboxylic acid containing at least 4 carbon atoms to form a polyamino-copolyamide containing tertiary amine groups, the mole ratio of (a) to (b) being from about 0.25:1 to about 10:1 and the mole ratio of methylbisaminopropylamine to the diesters being from about 0.9:1 to about 1.2:1 and then reacting the polyamino-copolyamide, in aqueous solution with from about 1 mole to about 1.5 moles of epihalohydrin per mole of tertiary amine groups present in said polyamino-copolyamide.

2. The paper product of claim 1, wherein the epihalohydrin is epichlorohydrin.

3. The paper product of claim 2, wherein the dicarboxylic acid contains 4 to 8 carbon atoms.

4. The paper product of claim 2, wherein the mole ratio of (a) to (b) is from about 1:4 to about 4:1.

5. The paper product of claim 4, wherein the dicarboxylic acid is glutaric acid or adipic acid.

6. The paper product of claim 5, wherein the diester of oxalic acid is diethyl oxalate.

7. The paper product of claim 6, wherein the diester of glutaric acid or adipic acid is the dimethyl ester.

* * * * *